United States Patent [19]

Swayze

[11] Patent Number: 5,115,265

[45] Date of Patent: May 19, 1992

[54] PHOTOGRAPHIC CAMERA WITH PIVOTABLE COVER PARTS

[75] Inventor: Samuel F. Swayze, Fairport, N.Y.

[73] Assignee: Eastman Kodak Company, Rochester, N.Y.

[21] Appl. No.: 637,853

[22] Filed: Jan. 7, 1991

[51] Int. Cl.⁵ .............................................. G03B 29/00
[52] U.S. Cl. .................................... 354/82; 354/81; 354/288
[58] Field of Search ............................ 354/81, 82, 288

[56] References Cited

U.S. PATENT DOCUMENTS

| | | | |
|---|---|---|---|
| 3,380,366 | 4/1968 | Olson | 354/82 |
| 3,836,985 | 9/1974 | Lange | 354/287 |
| 4,075,642 | 2/1978 | Niggeloh | 354/82 |
| 4,363,546 | 12/1982 | Enomoto et al. | 354/195 |
| 4,451,130 | 5/1984 | Yan | 354/82 |
| 4,493,542 | 1/1985 | Ohmura et al. | 354/82 |
| 4,601,562 | 7/1986 | Yoneyama et al. | 354/170 |
| 4,980,708 | 12/1990 | Leonard | 354/82 |

Primary Examiner—L. T. Hix
Assistant Examiner—J. K. Han
Attorney, Agent, or Firm—Roger A. Fields

[57] ABSTRACT

A photographic camera comprises a camera body having a pair of opposite ends and respective front openings for a taking ends and a viewfinder situated between the opposite ends, and a pair of cover parts normally substantially encasing the camera body. According to the invention, the camera body and the cover parts are connected for pivotal movement of the cover parts relative to the camera body to a convering or closed position encasing the camera body and to a fixed open position removed from the front openings to uncover the taking lens and the viewfinder and to form respective enclosed spaces between the opposite ends and the cover parts to allow one to manually grasp the cover parts at separate locations extended from the opposite ends.

5 Claims, 2 Drawing Sheets

PHOTOGRAPHIC CAMERA WITH PIVOTABLE COVER PARTS

BACKGROUND OF THE INVENTION

1. Field of the Invention

The invention relates generally to the field of photography and in particular to cameras.

2. Description of the Prior Art

Cameras are fragile pieces of equipment needing protection when they are carried about.

It is usual nowadays for a camera to have a cover part that is slidable relative to a body part between a closed position covering a taking lens and a viewfinder and a non-covering or open position removed from in front of the taking lens and the viewfinder. See U.S. Pat. No. 4,363,546, issued Dec. 14, 1982 and No. 4,601,562, issued Jul. 22, 1986. Generally, the cover part is connected to the body part for translation in opposite directions perpendicular to the optical axes of the lens and finder.

Another approach is for a camera to have a pair of cover parts that are pivotable relative to the body part between the closed position and the non-covering or open position. See U.S. Pat. No. 3,836,985, issued Sept. 17, 1974. In this instance, the cover parts are connected to the body part for pivoting about parallel axes transverse to the optical axes of the taking lens and the viewfinder.

SUMMARY OF THE INVENTION

According to the invention, a photographic camera comprising a camera body having a pair of opposite ends and respective front openings for a taking lens and a viewfinder situated between the opposite ends, and a pair of cover parts normally substantially encasing the camera body, is characterized in that:

mounting means connects the camera body and the cover parts for individual movement of the cover parts relative to the camera body to a covering position encasing the camera body and to a fixed open position removed from the front openings to uncover the taking lens and the viewfinder and to form respective enclosed spaces between the opposite ends and the cover parts to allow one to manually grasp the cover parts at separate locations directly across from the opposite ends.

More specifically, the camera body has a convex-shaped top and bottom longitudinally extending between the opposite ends, and the mounting means connects the camera body and the cover parts at respective locations along the convex-shaped top and bottom for pivotal movement of the cover parts relative to the camera body to the covering position and to the fixed open position. In the fixed open position, the cover parts may be manually grasped at separate locations extended from the camera body.

DETAILED DESCRIPTION OF THE PREFERRED EMBODIMENT OF THE INVENTION

The invention is disclosed as being embodied preferably in a conventional 35 mm still-picture camera. Because the features of this type of camera are well known, the description which follows is directed in particular to elements forming part of or cooperating directly with the preferred embodiment. It is to be understood, however, that other elements not shown or described may take various forms known to persons of ordinary skill in the art.

Figure 1:
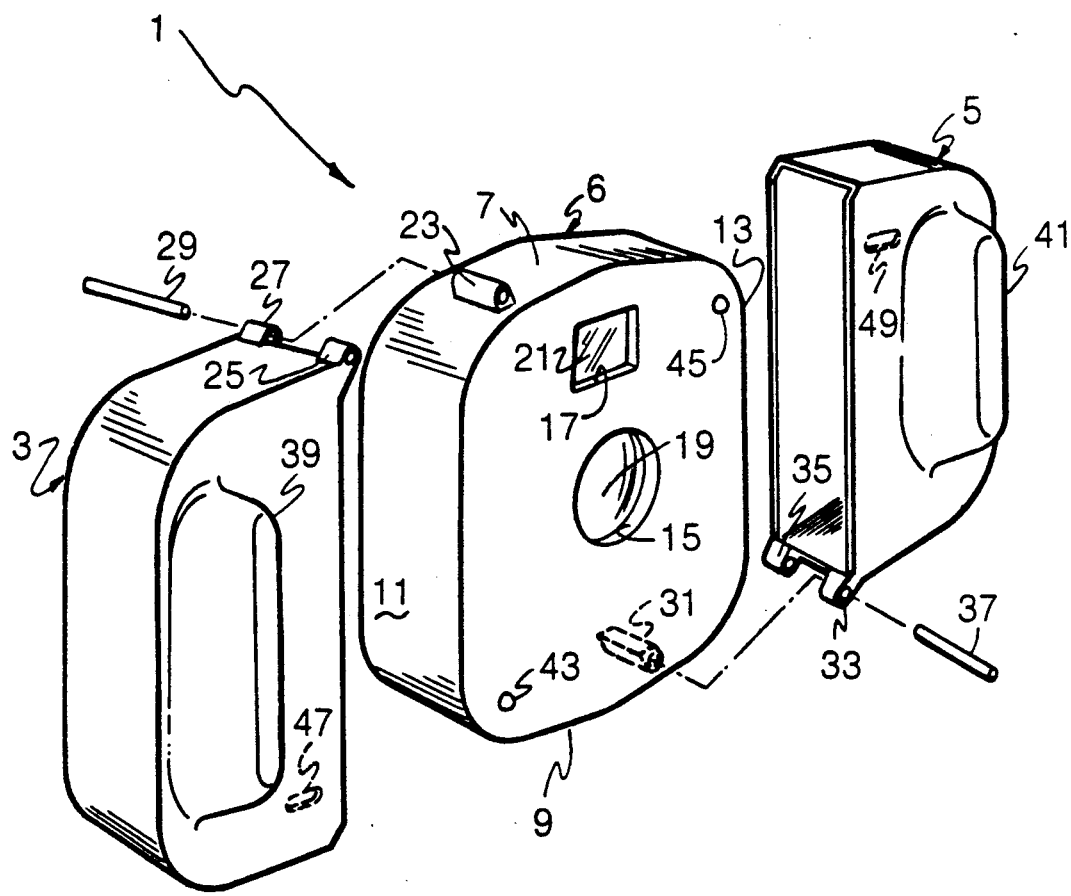
FIG. 1 is an exploded perspective view of a photographic camera with pivotable cover parts according to a preferred embodiment of the invention.

Referring now to the drawings, and in particular to FIG. 1, a 35 mm camera 1 is shown with twin cover parts 3 and 5.

The 35 mm camera 1 includes a camera body 6 having a convex-shaped top 7, a convex-shaped bottom 9, a pair of opposite ends 11 and 13, and respective front openings 15 and 17 for a taking lens 19 and a viewfinder 21.

Figure 4:
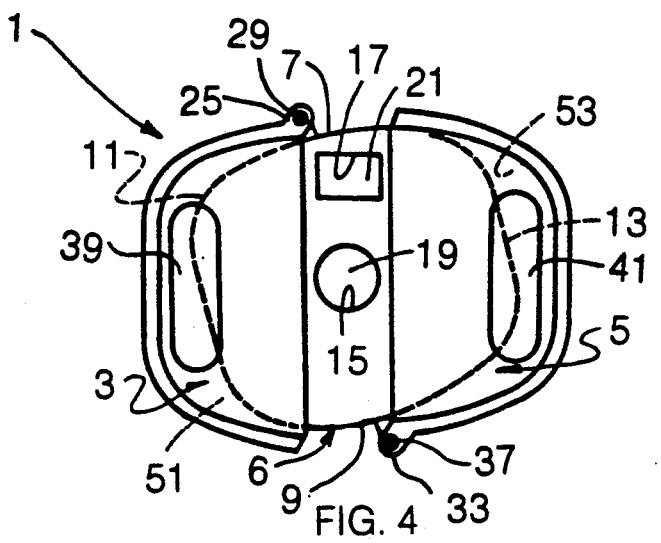

First mounting means pivotally connecting the camera body 6 and the cover part 3 comprises a lug 23 projecting from the convex-shaped top 7 of the camera body, front and rear lobes 25 and 27 of the cover part, and a pivot Pin 29 coupling the two lobes and the lug. See FIGS. 1 and 2. Second mounting means pivotally connecting the camera body 6 and the cover part 5 comprises a lug 31 depending from the convex-shaped bottom 9 of the camera body, front and rear lobes 33 and 35 of the cover part, and a pivot pin 37 coupling the two lobes and the lug. As shown in FIG. 4, the first and second mounting means are disposed at respective locations diagonally of each other, substantially above and below the front openings 15 and 17 for the taking lens 19 and the viewfinder 21.

OPERATION

Figure 2:
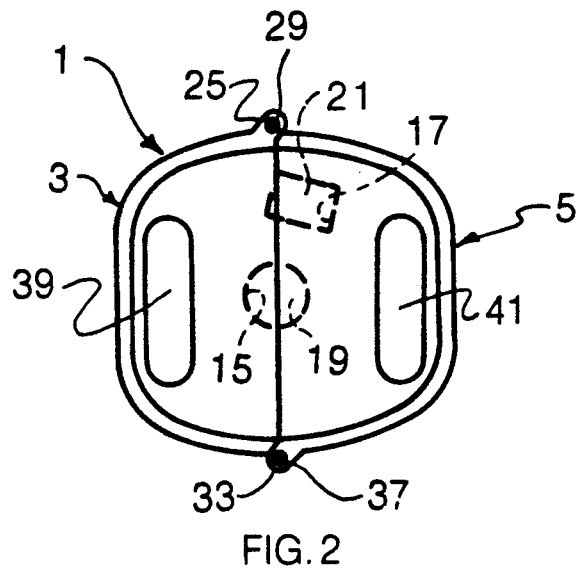
FIG. 2 is a front elevation view of the photographic camera, shown with the cover parts in a closed or covering position.

FIG. 2 shows the cover parts 3 and 5 in a normal closed or covering position substantially encasing the camera body 6.

Figure 3:
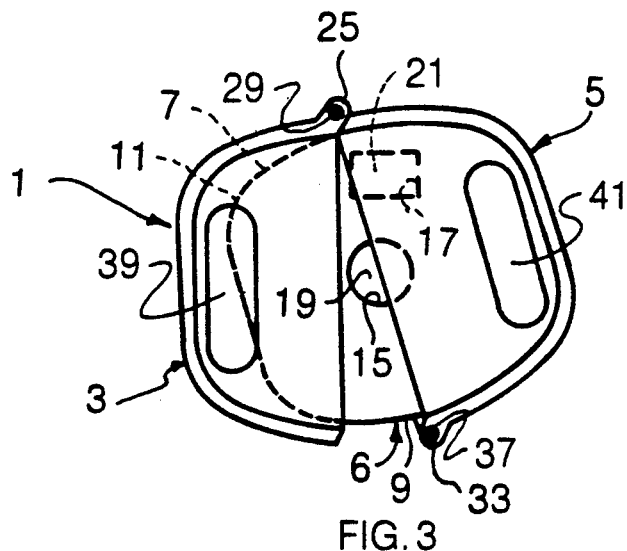
FIGS. 3 and 4 are front elevation views similar to FIG. 2, showing successive opening of the cover parts to an open or non-covering position.

Respective integral front handles 39 and 41 of the cover parts 3 and 5 allow one to readily grasp the covers parts to pivot them away from each other in a clockwise direction as viewed in FIGS. 3 and 4 to an open or non-covering position removed from the front openings 15 and 17 for the taking lens 19 and the viewfinder 21. Stop means comprising a pair of pins 43 and 45 that extend from the camera body 1 into respective elongate cavities 47 and 49 formed at the inside of the cover parts 3 and 5 operate to limit opening movement of the cover parts from the closed position to the open position. In the open position, respective enclosed spaces 51 and 53 are formed between the cover parts 3 and 5 and the opposite ends 11 and 13 of the camera body 1 to allow one to manually grasp the cover parts at separate locations extended from, i.e. directly across from, the opposite ends.

The invention has been described with reference to a preferred embodiment. However, it will be appreciated that various modifications can be effected within the ordinary skill in the art without departing from the scope of the invention. For example, the cover parts 3 and 5 in their closed Position need not cover the camera body 1 in its entirety.

I claim:

1. A photographic camera comprising a camera body having a pair of opposite ends and respective front openings for a taking lens and a viewfinder situated between said opposite ends, and a pair of cover parts normally substantially encasing said camera body, is characterized in that:

mounting means connects said camera body and said cover parts for individual movement of the cover parts relative to the camera body to a covering position encasing the camera body and to a fixed open position removed from said front openings to uncover said taking lens and said viewfinder and to form respective enclosed spaces between said opposite ends and the cover parts to allow one to manually grasp the cover parts at separate locations directly across from the opposite ends.

2. A photographic camera as recited in claim 1, wherein said mounting means includes respective means connecting said cover parts pivotally to said camera body at opposite locations substantially above and below said front openings.

3. A photographic camera as recited in claim 2, wherein said locations at which said cover parts are connected pivotally to said camera body are situated diagonally of each other when the cover parts are in their fixed open position.

4. A photographic camera as recited in claim 1, wherein said mounting means includes respective means connecting said cover parts pivotally to said camera body at opposite locations situated diagonally of each other when the cover parts are in their fixed position.

5. A photographic camera comprising a camera body having a pair of opposite ends and respective front openings for a taking lens and a viewfinder situated between said opposite ends, and a pair of cover parts normally substantially encasing said camera body, is characterized in that:

said camera body has a convex-shaped top and bottom longitudinally extending between said opposite ends; and mounting means connects said camera body and said cover parts at respective locations along said convex-shaped top and bottom for pivotal movement of the Cover parts relative to the camera body to a covering position encasing the camera body and to a fixed open position removed from said front openings to uncover said taking lens and said viewfinder and to form respective enclosed spaces between said convex-shaped top and bottom, said opposite ends and the cover parts to allow one to manually grasp the cover parts at separate locations extended from the camera body.

* * * * *